Figure 1:
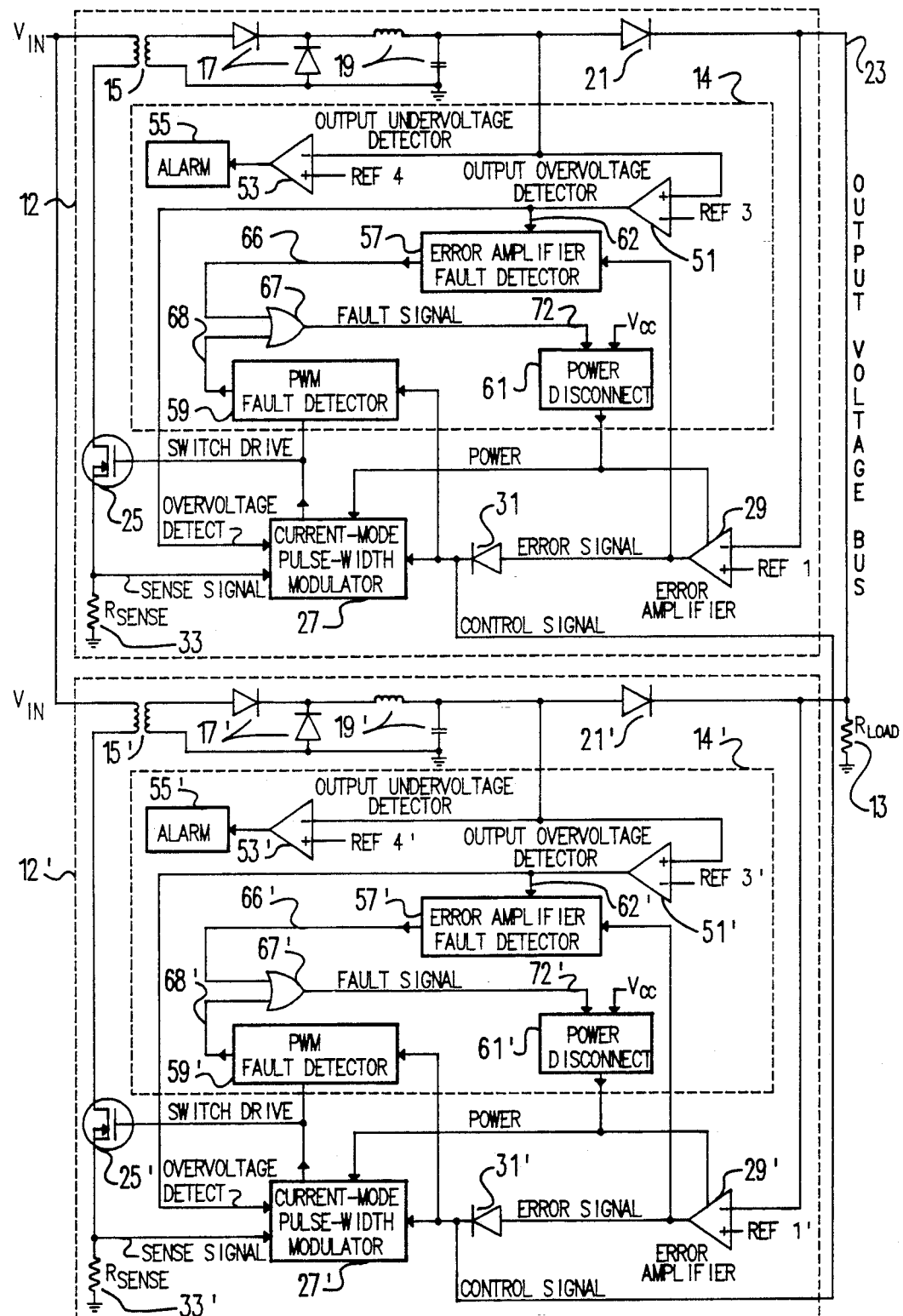

United States Patent [19]
Elliott et al.

[11] Patent Number: 5,122,726
[45] Date of Patent: Jun. 16, 1992

[54] OVERVOLTAGE PROTECTION FOR REDUNDANT POWER SUPPLIES

[75] Inventors: Brent A. Elliott, Plano; C. Lee Marusik, Allen; Edward D. Johnson, Plano, all of Tex.

[73] Assignee: Alcatel Network Systems, Inc., Richardson, Tex.

[21] Appl. No.: 606,406

[22] Filed: Oct. 31, 1990

[51] Int. Cl.$^5$ .................... H02H 7/122; H02M 3/335
[52] U.S. Cl. .................... 323/272; 363/56; 363/72; 361/18
[58] Field of Search .................... 307/43–48, 307/64–68, 80, 81, 296.1–296.8; 363/21, 56, 71, 72, 97; 323/271, 272, 282–285; 361/18, 90, 91, 1; 364/187, 184; 371/24, 25.1; 340/663; 324/500, 537

[56] References Cited

U.S. PATENT DOCUMENTS

| | | | |
|---|---|---|---|
| 4,403,213 | 9/1983 | Khamare et al. | 340/517 |
| 4,685,020 | 8/1987 | Driscoll et al. | 361/18 |
| 4,703,410 | 10/1987 | Pepper | 363/56 |
| 4,843,532 | 6/1989 | Freedman | 363/26 |
| 4,912,621 | 3/1990 | Kobayashi et al. | 363/71 |
| 4,979,066 | 12/1990 | Kawata et al. | 361/10 |

Primary Examiner—A. D. Pellinen
Assistant Examiner—David Osborn
Attorney, Agent, or Firm—Bruce C. Lutz; Dennis O. Kraft

[57] ABSTRACT

Overvoltage and component failure protection for redundant current-mode controlled power supplies operating in parallel takes a supply off line when the supply drives the output bus to an overvoltage condition, without removing properly functioning supplies from the bus. The supply is also taken off line when either the error amplifier or the PWM fails.

16 Claims, 3 Drawing Sheets

OVERVOLTAGE PROTECTION FOR REDUNDANT POWER SUPPLIES

This invention relates to power supplies and, more specifically, to overvoltage protection for, in the preferred embodiment, switched mode power supplies operating in parallel.

Power supply redundancy may be achieved by several methods. One method is to use a relay to switch a back-up slave supply on line in response to a detected fault condition in the master supply [8]. One major disadvantage of this approach is the considerable time required to respond to the fault.

Another approach to providing redundancy is to connect two or more supplies directly in parallel to a power bus. The major drawback of this configuration is that a shorted output section in any of the paralleled supplies overloads the power bus and results in the loss of power to the loads.

A solution to this problem is to use diodes to isolate the outputs of each power supply. Regulation sensing must be connected at the power bus to overcome the problem of poor regulation due to voltage drop across the isolation diode. When the load demand is less than the capacity of a single supply, only the supply with the highest internal reference is delivering power. The remaining supplies will shut off due to the imbalance in the individual reference voltages. As the load is increased beyond its capacity, the supply goes into current limit and its output voltage decreases. When the output voltage reaches the potential of the reference voltage of one of the redundant supplies, the redundant supply starts to provide the remaining load. In an N+1 redundant power system, N−1 supplies operate in current limit. One supply operates in voltage regulation mode with a load less than its current limit value. The redundant supply, with the lowest reference, is shut off.

The major disadvantage of such systems is that the on line supplies operate at much higher temperatures and stress levels than the redundant supply. Since the failure rate of electronic components increases exponentially with linearly increasing temperature, the reliability of the system will be less than optimum. To meet system reliability objectives, it may be necessary to force all of the supplies to equally share the load current.

Equal load sharing can easily be implemented with current-mode control. Current-mode control was first disclosed by Weinberg and O'Sullivan in 1977 [1], and has since been frequently discussed in other literature [2, 3, 4, 6, 7]. The introduction of a current-mode control integrated circuit [5] has generated much interest in the control scheme. Today, many different current-mode control integrated circuits are available from all the major circuit manufacturers.

Current-mode control uses an inner loop to compare the peak inductor current with the error signal from the error amplifier. As the error signal changes, the peak switching current follows proportionally to deliver more or less current to the load as required to maintain output voltage regulation. The control scheme allows a common error signal to be used to achieve equal current sharing in the paralleled supplies [6].

Generally such a system is connected in a dedicated master-slave configuration. Only the master error amplifier is used to sense the load voltage, and its error signal is distributed to the slave supplies. While this technique provides equal current sharing in all the paralleled supplies, there is no redundancy since a failure in the master supply causes loss of control in all slave supplies.

Redundant current sharing of current-mode controlled power supplies can be achieved by allowing the error amplifier in each of the paralleled supplies to sense the load voltage, and connecting the error amplifier outputs together through isolation diodes. The resulting control signal then forces all paralleled supplies to share the load equally. The error amplifier with the highest internal reference voltage overrides the other error amplifiers in the system, and thus functions as the master.

If the master error amplifier decreases such that its output is lower than required to maintain the load voltage in regulation, the isolation diode prevents the error amplifier from further affecting the output voltage bus. The parallel supply with the highest error signal then functions as the master.

Overvoltage shutdown is commonly used to disable a power supply when an excessive output voltage is sensed. An increase in the internal reference voltage for an error amplifier causes that amplifier output to increase. A failure in the amplifier itself can cause the control signal to increase. The control signal forces the outputs of all the paralleled supplies to increase. Detection of an output overvoltage in any of the redundant supplies will shut it down, defeating the redundancy feature.

The output voltage can also increase if, in any of the paralleled supplies, the circuitry between the common control signal and the switch transistor (i.e., the pulse width modulator circuit) has a fault. A failure in the pulse width modulator can cause one power supply to operate at maximum duty cycle, driving the output bus into overvoltage. In this case, each of the error amplifiers would sense an excessive output voltage and saturate to its negative rail to drive the control signal low. Detection of an output overvoltage in any of the redundant supplies will shut it down, defeating the redundancy feature.

REFERENCES

[1] A. Weinberg, D. M. O'Sullivan, "LC$^3$: Application to Voltage Regulation," Proceeding to the Third ESTEC Spacecraft Power Conditioning Seminar, 1977.

[2] Cecil W. Deisch, "Simple Switching Control Method Changes Power Converter Into a Current Source," IEEE Power Electronics Specialists Conference, 1978 Record.

[3] Shi-Ping Hsu, Art Brown, Loman Rensink, R. D. Middlebrook, "Modeling and Analysis of Switching Dc-to-Dc Converters in Constant-Frequency Current-Programmed Mode," IEEE Power Electronics Specialists Conference, 1979 Record.

[4] Richard Redl, Istvan Novak, "Instabilities in Current-Mode Controlled Switching Voltage Regulators," IEEE Power Electronics Specialists Conference, 1981 Record.

[5] Barney Holland, "A New Integrated Circuit for Current Mode Control," Proceedings of Powercon 10, 1983, San Diego.

[6] William W. Burns III, Anil K. Ohri, "Improving Off-Line Converter Performance with Current-Mode Control," Proceedings of Powercon 10, 1983, San Diego.

[7] Barney Holland, "Modeling, Analysis and Compensation of the Current-Mode Converter," Proceedings of Powercon 11, 1984, Dallas.

[8] Lee Marusik, "Master and Slave Power Supply Control Circuits," U.S. Pat. No. 4,520,275, May 1985.

Figure 2:
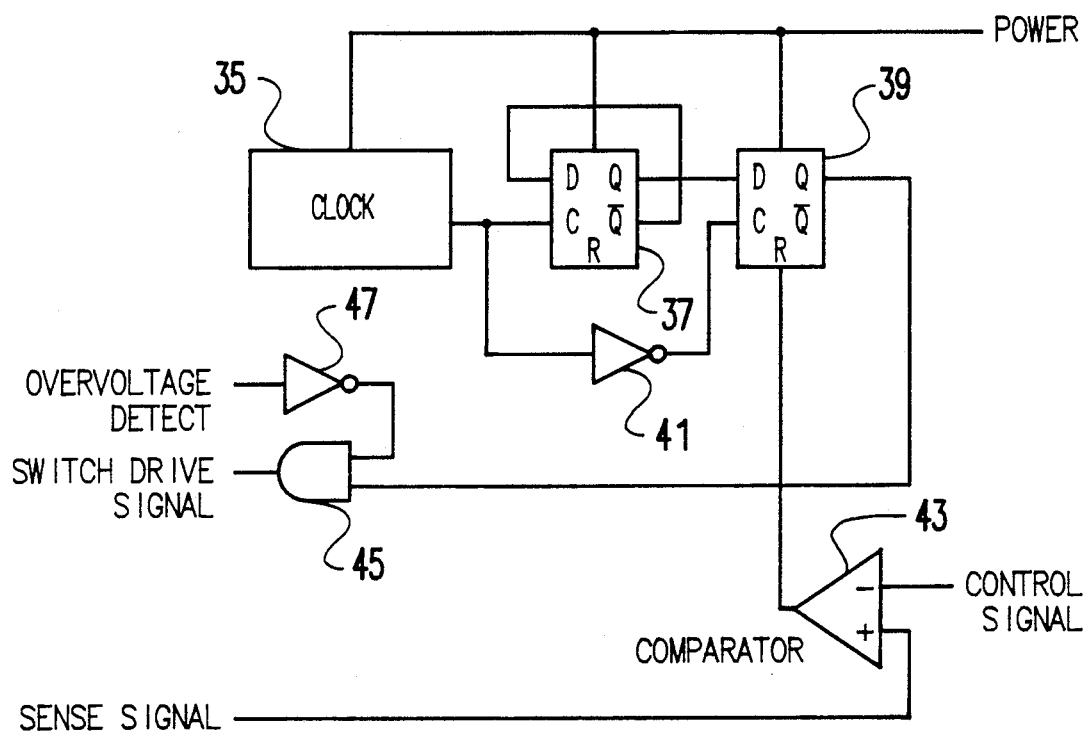
Figure 3:
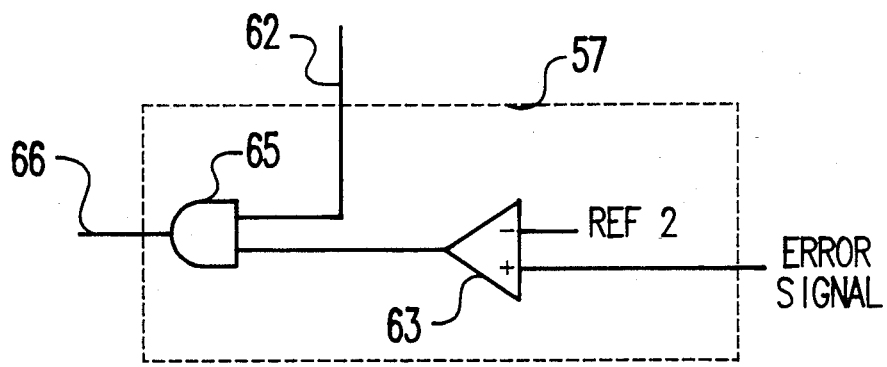
Figure 4:
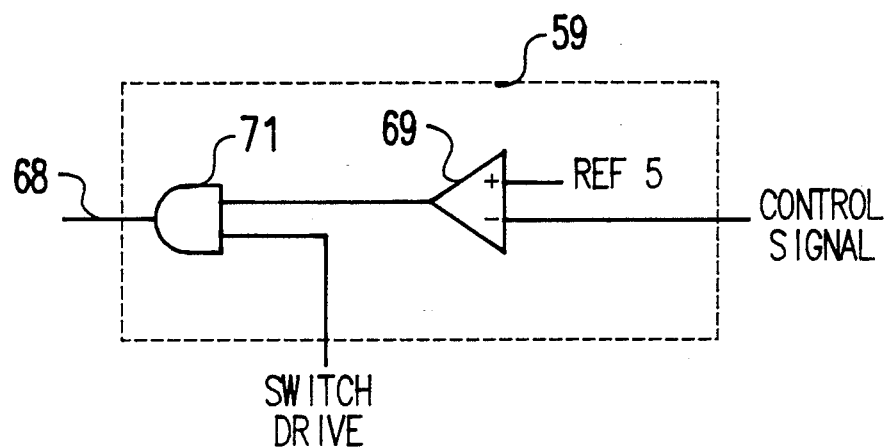
Figure 5:
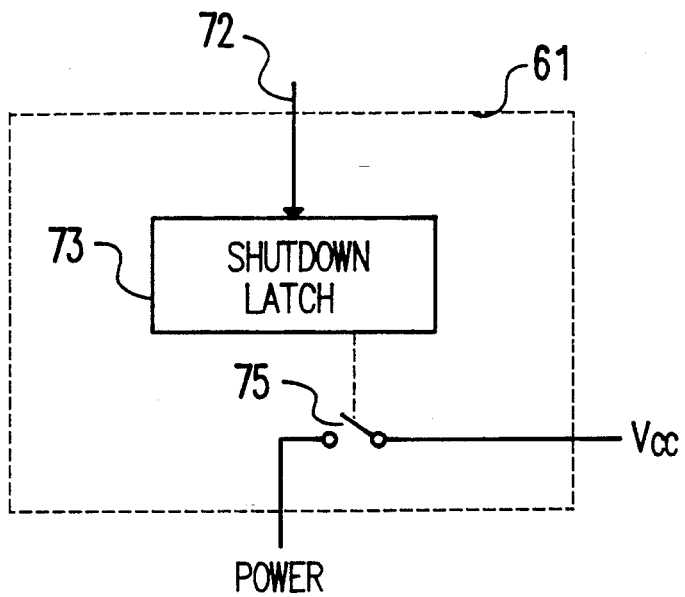

In accordance with the present invention, the above identified matters are addressed by means ensuring that only a faulty supply is shut down. These and other features, objects, and advantages of the invention will become more apparent upon reference to the following specification, claims, and appended drawings in which:

FIG. 1 is a block diagram schematic illustrating the presently preferred embodiment;

FIG. 2 is a block diagram schematic illustrating a typical embodiment of a FIG. 1 element, namely, a current mode pulse width modulator; and FIGS. 3, 4, and 5 are block diagram schematics showing, respectively, items 57, 59, and 61 of FIG. 1, in greater detail.

Turning now to FIG. 1, therein is shown a pair of redundant current-mode controlled, overvoltage protected power supplies 12 and 12' connected in parallel to a common load 13. Supplies 12 and 12' are also connected at their inputs to receive a common DC input voltage $V_{IN}$. As will be further elaborated on hereinafter, supplies 12 and 12' have one further interconnection; i.e., suitable points in their feedback loops are connected together to effect a common control signal.

Overvoltage protected supplies 12 and 12' are, except for reasonable manufacturing and component tolerances and variations, duplicates of one another, and elements in supply 12 have direct counterparts in supply 12'. For simplicity in notation, therefore, an item number used in connection with supply 12 will also be used to designate its counterpart in supply 12' except that the prime/accent symbol will be added to denote the counterpart element.

Focusing now on supply 12, it will be recognized by those skilled in the art that the FIG. 1 elements inside block 12 but outside block 14 represent a conventional prior art switched-mode, current-mode controlled, fixed-frequency, pulse width modulated power supply. Briefly describing this conventional portion of FIG. 1, an input DC voltage $V_{IN}$ is connected to a transformer 15 which outputs to a rectifier circuit 17 and filter circuit 19. The DC voltage output of filter 19 is connected through an isolation diode 21 to the output voltage bus 23. A power switch transistor 25, in the primary circuit of transformer 15, accomplishes a chopping of $V_{IN}$, and is driven on and off by a current-mode pulse width modulator 27 which is part of a feedback circuit that includes a serially connected error amplifier 29 and amplifier isolation diode 31, such combination itself being connected between output voltage bus 23 and an input of modulator 27. Amplifier 29 compares the output of isolation diode 21 with an internal reference voltage REF 1 to generate an error signal. Diode 31 isolates the error signal output of amplifier 29 to generate an isolated control signal which is input to modulator 27. Modulator 27 also receives an overvoltage detect input and, from a current sense resistor 33 in series with the power switch 25, a current sense signal input. Such sense signal is, in the preferred embodiment, proportional to switch current.

As seen in FIG. 2, a typical current-mode pulse width modulator 27 comprises a clock 35, a pair of delay (D-type) flip-flops 37 and 39, an inverter 41, a comparator 43, an inverter 47, and an AND gate 45. The clock 35 drives the C input of flip-flop 37 and, via inverter 41, the C input of flip-flop 39. The Q and D input of flip-flop 37 are connected together, and the Q output of flip-flop 37 is connected to the D input of flip-flop 39. The flip-flop 39 Q output is connected as one input to AND gate 45. The other input to AND gate 45 is for receiving the inverted overvoltage detect input, and the AND gate 45 output is for supplying the switch drive signal. The non-inverting input of comparator 43 is for receiving the current sense signal from sense resistor 33, and the inverting input of comparator 43 is for receiving the control signal appearing at the cathode of diode 31. The output of comparator 43 is connected to the R (reset) input of flip-flop 39.

In operation, the FIG. 2 clock 35 runs at twice the switching frequency of the power supply. A clock running at twice the switching frequency is used so that the flip-flops 37 and 39 and inverter 41 can limit power switch duty cycle to 50 percent maximum to provide double pulse suppression. Double pulse suppression is desirable to prevent the switch transistor from turning on before two clock cycles have passed, so that the output transformer does not saturate when recovering from a fault condition. At the beginning of a cycle, the clock 35 causes the flip-flop 39 Q output to switch high, driving the output of AND gate 45 high to turn on the power switch transistor. The current sense resistor 33 monitors the linearly increasing switch current, and will cause the voltage at the non-inverting input of the comparator 43 to increase. When this voltage crosses the control signal threshold, the comparator 43 output will switch appropriately to reset the flip-flop 39, turning off the power switch transistor. The cycle repeats when the next suitable clock signal occurs. An overvoltage detect input will inhibit the switch drive output signal instantaneously in the event of an overvoltage condition.

Focusing now on the overvoltage protection portion 14 of FIG. 1, same comprises an output overvoltage detector 51, an error amplifier fault detector 57, a PWM fault detector 59, an OR gate 67, a power disconnect circuit 61, and an output undervoltage detector 53 and alarm 55.

Overvoltage detector 51 comprises whose inverting input is connected to a voltage reference REF 3 and whose non-inverting input is connected to the DC voltage at the input of isolation diode 21.

Referring simultaneously now to FIGS. 1, 3, 4, and 5, the overvoltage detector output provides the overvoltage detect input to modulator 27 and is also connected to input 62 of the error amplifier fault detector 57. The other input of error amplifier fault detector 57 is connected to the error signal output of the error amplifier 29. The error amplifier fault detector 57 comprises a comparator 63 and an AND gate 65, comparator 63 having its inverting input connected to a reference voltage REF 2, having its non-inverting input connected to the error amplifier 29 error signal output, and having its output connected to an input of AND gate 65. The other input 62 of AND gate 65 is connected to receive the output of the overvoltage detector 51.

The output 66 of AND gate 65, which is also the output of error amplifier fault detector 57, is connected to an input of OR gate 67.

The other input to OR gate 67, is connected to receive the output 68 of PWM fault detector 59 which receives as input the control signal and the switch drive signal. PWM fault detector 59 comprises a comparator 69 and an AND gate 71, comparator 69 having its non-inverting input connected to a reference voltage REF 5, having its inverting input connected to receive the control signal, and having its output connected to an input of AND gate 71. The other input of AND gate 71 is connected to the switch drive signal.

Power disconnect circuit 61 receives as input the output 72 of OR gate 67 and provides latched shutdown by causing bias supply $V_{CC}$ (i.e., circuit power) to be removed from error amplifier 29 and modulator 27 when a suitable command appears at the output of OR gate 67. More specifically, power disconnect circuit 61 comprises a shutdown latch 73 and a normally closed switch 75 which is under the control of latch 73. Upon appearance of a predetermined logic level at the output 72 of OR gate 67, shutdown latch 73 causes normally closed switch 75 to open and to stay open until some quite deliberate action, service, maintenance or the like is effected.

Undervoltage detector 53 comprises a comparator whose non-inverting input is connected to a voltage reference REF 4 and whose inverting input is connected to the DC voltage appearing at the input of isolation diode 21. The undervoltage detector output drives an alarm 55 which is suitable for identifying to maintenance personnel the supply unit wherein undervoltage is sensed. In the preferred embodiment, alarm 55 provides local and remote alarm reporting for fault isolation.

Turning now to describing the operation of the FIG. 1 apparatus, each error amplifier 29 and 29' compares the voltage of the output voltage bus 23 with an internal reference voltage, REF 1 and REF 1' respectively. The error amplifier with the highest reference voltage functions as the master and provides a control signal to both supplies. Since the threshold is the same for both comparators 43 and 43', both power transistors 25 and 25' switch off at the same value of peak current to effectively maintain equal output current from both supplies. The error amplifier in the redundant supply saturates at its negative rail, reverse biasing the associated error amplifier isolation diode, 31 or 31', to open its control loop.

Now suppose that the reference voltage (REF 1 or REF 1') on the master supply starts to decrease. Its error amplifier output will decrease accordingly, causing the output voltage of both supplies to decrease. When the output voltage at 23 drops below the internal reference of the redundant supply, its error amplifier comes out of saturation to gain control of the control signal. The error amplifier of the master supply saturates at its negative rail, and the role of the master shifts to the redundant supply. Both supplies continue to deliver equal current to the load.

Suppose that the output of the master error amplifier starts to increase, due to a failure in the error amplifier or its reference. Since its error amplifier already provides the control signal, the output of both supplies increases accordingly. Alternately, a similar fault in the redundant supply causes it to dynamically become the master, forcing the output voltage of both supplies to increase.

In accordance with sound practice, some means is usually provided to prevent an excessively high output voltage at the load. A common prior art technique is to use a latching overvoltage sensor which trips upon an output overvoltage condition to shut down a faulty supply. However, due to offsets in the overvoltage sensing thresholds REF 3 and REF 3' and in the output isolation diodes, the properly functioning power supply may be the first to shut down, thereby eliminating the redundancy feature. Also, a failure in a pulse width modulator can cause one power supply to operate at maximum duty cycle, driving the output voltage bus into overvoltage. Again, due to offsets in the overvoltage sensing thresholds and in the output isolation diodes, the properly functioning power supply may be the first to shut down when using such prior art technique. Detection of an output overvoltage in the properly functioning redundant supply will shut it down, defeating the redundancy feature.

In our approach to avoiding the problem of shutting down a properly functioning redundant power supply, an error amplifier fault detector, a PWM fault detector, a non-latching overvoltage detector, and a latching power disconnect are used to ensure that only the faulty supple shuts down. The sufficient independent conditions for identifying the faulty supply are:
1. That an overvoltage condition is sensed on its output terminals, and that its error amplifier is functioning as the master.
2. That the control signal is not true at the input of the switch transistor.

When either the first or second condition are met, the supply is shut off until power is temporarily removed to reinitialize operation.

A non-latching overvoltage detector is used to sense whether a power supply output has exceeded its normal voltage regulation range. The function of the detector is to command the switch transistor off as long as the output overvoltage condition exists. This momentarily shuts the power supply off until its output voltage decays below the overvoltage detector threshold. The cycle repeats itself and the power supply operates in a voltage limiting mode. When operating in this mode the overvoltage detector function replaces the error amplifier to regulate the output voltage at the overvoltage detect limit. Such mode may also be characterized as a momentary or non-latching shut-down of the power supply.

The normal operating range of the output of the error amplifier in the master supply is bounded by a lower limit well above its saturation voltage. The function of the error amplifier fault detector is to sense whether an error amplifier output is operating above its saturation voltage, which defines it as the master supply.

The shutdown latch is set whenever an output overvoltage condition is sensed while the error amplifier fault detector is indicating master status for the supply. This shutdown latch causes the power to be removed from the error amplifier and current-mode pulse width modulator causing the switch transistor to turn off. The transistor remains off until the shutdown latch is reset by temporarily removing input power to the supply. Once power is removed from the faulty control loop, its error amplifier output goes to the negative rail, reverse biasing its isolation diode. This prevents the faulty error amplifier or its reference from driving the control signal high. Since only the master error amplifier or its reference can force the control signal to cause an overvoltage condition, this causes a faulty supply to properly shut itself down.

In the event that the redundant supply senses an output overvoltage condition prior to the master supply, it operates in a voltage limiting mode. The shutdown latch in that redundant supply is disabled since its error amplifier is saturated at its negative rail. The output voltage of the master supply continues to increase, and sets its shutdown latch when an overvoltage condition is finally sensed on its output. The master is then shut off, with its error amplifier disabled. Load regulation is restored, with the redundant supply dynamically becoming its own master.

To be complete, our overvoltage protection scheme also causes a faulty supply to shut down if the pulse width modulator fails to provide an output that is true to the control signal input. Given the bounded lower limit of the control signal, the switch transistor off command is defined. A PWM fault detector compares the control signal to the on/off command for the switch transistor. If the control signal is commanding the switch transistor off and the switch receives an on command, the power supply shutdown latch is set. Load regulation is restored, with the redundant supply dynamically becoming its own master.

This ensures that only the supply which causes an output overvoltage fault shuts itself down. When its output decays to the threshold of the undervoltage detector, an alarm is provided to isolate the fault. The faulty supply can then be replaced without interruption of regulated power to the loads, restoring power supply redundancy.

Any number of power supplies with these features can be connected in parallel to form an N+1 redundant power system, with each supply connected to the common control signal.

Also, the principles herein can be applied to supplies other than current-mode controlled PWM supplies. For example, such principles may be applied to voltage-mode controlled supplies. One way of accomplishing such variation would be to replace each current-mode pulse width modulator with a voltage-mode modulator. An example of a voltage-mode pulse width modulator could be achieved by substituting, in the FIG. 2 circuit, and in place of a current sense signal, a suitable ramp signal at the non-inverting input of comparator 43.

Thus, while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. Power supply apparatus comprising:
   first means comprising:
   (a) a fixed-frequency current-mode controlled switched-mode power supply means including:
   a power switch for chopping an input voltage in accordance with a pulse width modulated drive signal;
   an output isolation diode for electrical isolation of the power supply output;
   an error amplifier for comparing the output of the isolation diode with an internal reference voltage to generate an error signal;
   an error amplifier isolation diode for isolating the output of the error amplifier to generate an isolated control signal;
   a sense resistor for monitoring switch current to generate a sense signal proportional to switch current; and
   a current-mode pulse width modulator for providing a pulse width modulated drive signal to the power switch in response to the error signal input and to the sense signal input, and for providing non-latching power supply shutdown in response to an overvoltage detect input;
   (b) an output overvoltage detector means for sensing an overvoltage condition on the output of the power supply means;
   (c) an error amplifier fault detector means for determining whether an overvoltage condition sensed by the output overvoltage detector means is being caused by a failure of either the error amplifier or its internal reference voltage;
   (d) a PWM fault detector means for determining whether the output of the current-mode pulse width modulator properly responds in accordance with the control signal input; and
   (e) a power disconnect means for causing latched power supply shutdown in response to the error amplifier fault detector means indicating that an overvoltage condition is caused by a failure of the error amplifier, or in response to the PWM fault detector means indicating that the current-mode pulse width modulator output is not true to the pulse width modulator's input;
   second means comprising another corresponding one of said first means;
   the output isolation diode of the first means power supply being connected to the corresponding output isolation diode of the second means for supplying power to a common load;
   the error signal of the first means being connected to the corresponding error signal of the second means, whereby the error amplifier of either the first means or the second means dynamically becomes a master to provide a common error signal input to both current-mode pulse-width modulators for forcing the output current from the first means to be equal to the output current of the second means.

2. Apparatus as defined in claim 1 wherein said error amplifier fault detector means:
   (a) senses the error amplifier output to determine whether it is acting as the master, and
   (b) provides a shutdown signal to the power disconnect means whenever the output overvoltage detector means senses an overvoltage condition on the output, provided that the error amplifier is acting as the master.

3. Apparatus as defined in claim 2 wherein the shutdown signal is disabled whenever said error amplifier fault detector means senses that the error amplifier is not acting as the master.

4. Apparatus as defined in claim 2 wherein said power disconnect means provides latched power supply shutdown by removing power from the current-mode pulse width modulator.

5. Apparatus as defined in claim 4 wherein said power disconnect means disables the faulty error amplifier by removing power from such error amplifier, thereby isolating its output from the error signal.

6. Apparatus as defined in claim 5 wherein only the faulty power supply properly shuts down in response to an overvoltage condition on its output, while the remaining redundant power supply continues to deliver regulated power to the load.

7. Apparatus as defined in claim 6 wherein said first means further includes an output undervoltage detector means to sense that the power supply has been shut down, and an alarm means to provide local and remote alarm reporting for fault isolation.

8. Power supply apparatus comprising:
first means comprising:
- (a) a fixed-frequency switched-mode power supply means including:
  - a power switch for chopping an input voltage in accordance with a pulse width modulated drive signal;
  - an output isolation means for electrical isolation of the power supply output;
  - an error amplifier for comparing the output of the isolation means with an internal reference voltage to generate an error signal;
  - an error amplifier isolation means for generating an isolated control signal; and
  - a pulse width modulator for providing a pulse width modulated drive signal to the power switch in response to the error signal input and for providing non-latching power supply shutdown in response to an overvoltage detect input;
- (b) an output overvoltage detector means for sensing an overvoltage condition on the output of the power supply means;
- (c) an error amplifier fault detector means for determining whether an overvoltage condition indicated by the output overvoltage detector means is being caused by a failure of either the error amplifier or its internal reference voltage;
- (d) a PWM fault detector means for determining whether the output of the pulse width modulator properly responds in accordance with the error signal input; and
- (e) a power disconnect means for causing latched power supply shutdown in response to the error amplifier fault detector means indicating that an overvoltage condition is caused by a failure of the error amplifier, or in response to the PWM fault detector means indicating that the pulse width modulator output is not true to its input;

second means comprising another corresponding one of said first means;

the output isolation means of the first means being connected to the corresponding output isolation means of the second means for supplying power to a common load;

the error signal of the first means being connected to the corresponding error signal of the second means, whereby the error amplifier of either the first means or the second means dynamically becomes a master to provide a common error signal input to both pulse-width modulators.

9. Apparatus as defined in claim 8 wherein said error amplifier fault detector means:
- (a) senses the error amplifier output to determine whether it is acting as the master, and
- (b) provides a shutdown signal to the power disconnect means whenever the output overvoltage detector means senses an overvoltage condition on the output, provided that the error amplifier is acting as the master.

10. Apparatus as defined in claim 9 wherein the shutdown signal is disabled whenever said error amplifier fault detector means senses that the error amplifier is not acting as the master.

11. Apparatus as defined in claim 9 wherein said power disconnect means provides latched power supply shutdown by removing power from the pulse width modulator.

12. Apparatus as defined in claim 11 wherein said power disconnect means disables the faulty error amplifier by removing power from said error amplifier, thereby isolating its output from the control signal.

13. Apparatus as defined in claim 12 wherein only the faulty power supply properly shuts down in response to an overvoltage condition on its output, while the remaining redundant power supply continues to deliver regulated power to the load.

14. Apparatus as defined in claim 13 wherein said first means further includes an output undervoltage detector means to sense that the power supply has been shut down, and an alarm means to provide local and remote alarm reporting for fault isolation.

15. Power supply apparatus comprising:
first means comprising (A) a switched-mode power supply means for producing an output DC voltage and including a feedback loop for driving a power switch, said loop being between the power supply output and the power switch and including an error amplifier which outputs a control signal, and a power switch modulator, the modulator having an input for receiving the control signal from the error amplifier and having an output for supplying a switch drive signal to the power switch; (B) overvoltage detector means for monitoring the power supply output voltage and for outputting a signal when a supply output overvoltage condition occurs; (C) means for shutting down the power supply means; (D) means for (i) monitoring the switch drive signal and the error amplifier output and (ii) causing said (C) means for shutting down the power supply to shut down the power supply when either or both of the following conditions exists, namely, (1) during a supply output overvoltage condition, when the error amplifier is determined to incorrectly be a cause of the supply overvoltage signal due to component failure, or (2) the switch drive signal is determined to not be a correct response to the control signal;

second means comprising, a corresponding second one of said first means;

the first and corresponding second means outputs being connected together for supplying a common DC output voltage; and the first and second means feedback loops including means for effecting a common control signal for both modulators.

16. Apparatus as defined in claim 15 wherein said means for effecting a common control signal comprises a diode in the first means feedback loop, a corresponding diode in the second means feedback loop, and electrical connection between said diodes.

* * * * *